United States Patent [19]

Adama et al.

[11] 3,920,593

[45] Nov. 18, 1975

[54] PROCESS FOR THE PREPARATION OF POLYAMIDE FOAM PLASTICS

[75] Inventors: Robert A. Q. Adama, Den Haag; Marten H. B. van der Beek, Pijnacker; both of Netherlands

[73] Assignee: Stamicarbon, N.V., Geleen, Netherlands

[22] Filed: Aug. 23, 1973

[21] Appl. No.: 390,717

Related U.S. Application Data

[63] Continuation of Ser. No. 108,413, Jan. 21, 1971, abandoned.

[30] Foreign Application Priority Data

Jan. 21, 1970 Netherlands ..................... 7000810

[52] U.S. Cl. ......... 260/2.5 N; 260/2.5 B; 260/2.5 F; 260/37 N; 260/824 R; 260/826
[51] Int. Cl. ........................................... C08g 53/10
[58] Field of Search ...................... 260/2.5 N, 2.5 E

[56] References Cited

UNITED STATES PATENTS

| | | | |
|---|---|---|---|
| 3,072,584 | 1/1963 | Karpovich | 260/2.5 E |
| 3,271,331 | 9/1966 | Ender | 260/2.5 F |
| 3,322,696 | 5/1967 | Fisher et al. | 260/2.5 N |
| 3,485,774 | 12/1969 | McKenica | 260/2.5 E |
| 3,558,532 | 1/1971 | Sundquist et al. | 260/2.5 E |
| 3,766,099 | 10/1973 | Kawai et al. | 260/2.5 E |

*Primary Examiner*—Morton Foelak
*Attorney, Agent, or Firm*—Cushman, Darby & Cushman

[57] ABSTRACT

An improvement in the process for producing foamed polyamide materials by anionically polymerizing lactam monomers wherein the foam produced has uniform cell size and improved properties is disclosed.

The improvement comprises adding at least one foam stabilizing agent and at least one finely divided, porous substance to the monomers prior to polymerization.

11 Claims, 6 Drawing Figures

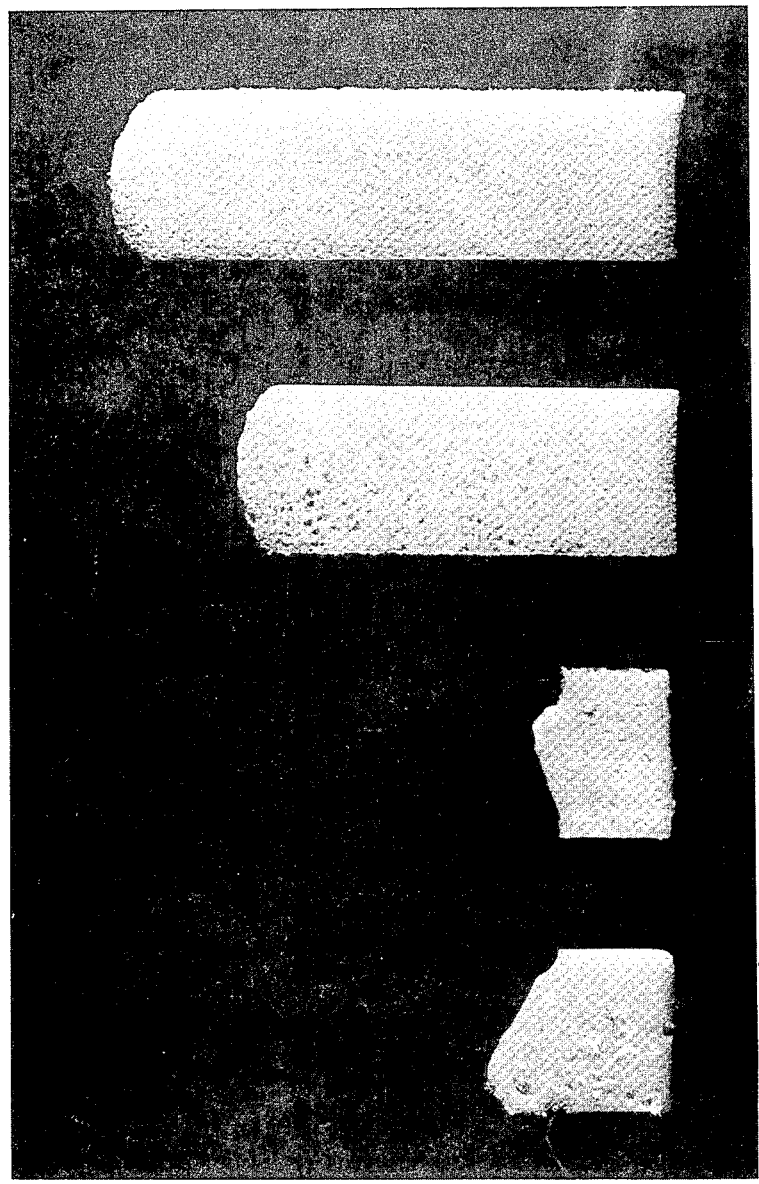

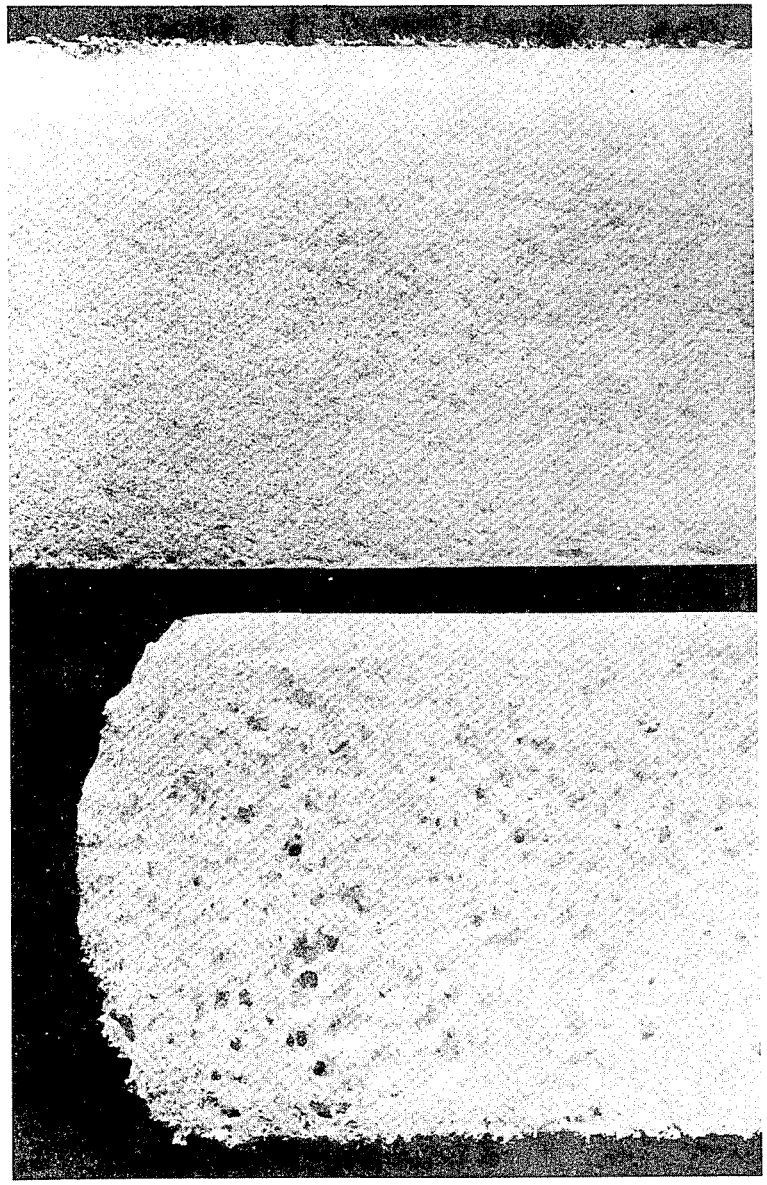

PROCESS FOR THE PREPARATION OF POLYAMIDE FOAM PLASTICS

This is a continuation of application Ser. No. 108,413, filed Jan. 21, 1971, now abandoned.

The present invention relates to an improved process for the preparation of foamed polyamide plastics wherein lactams are anionically polymerized in the presence of a blowing agent and pore-controlling substances.

Polyamide foam plastics have been prepared by introducing gases known in the art as 'blowing agents' into the reaction mixture during the polymerization. The gas can be physically admixed with the reaction mixture during the polymerization or generated in situ during the polymerization by the evaporation or decomposition of a substance or compound which is added to the reaction mixture just prior to polymerization and which evaporates or decomposes forming gaseous products at the polymerization temperature. In either process, it has been found that it is very difficult to produce a uniform product. The foamed material contains relatively large and non-uniform pores. In an attempt to minimize the non-uniformity of the foamed material, pore-controlling agents such as organosiloxane oxylalkylene block copolymers (such as disclosed in Belgian Pat. No. 722,518) or other foam stabilizers and surface active agents (particularly non-ionic agents disclosed in Belgian Pat. No. 718,286) have been added to the reaction mixture prior to polymerization. Solids such as kieselguhr and animal charcoal have also been added to the reaction mixture to promote development of uniform pores, see for example, British patent specification No. 918,059. Finely divided solids, such as silica gel or talcum have also been added, see for example Belgian Pat. No. 722,514.

The pore-controlling agents reduce the non-uniformity of the foam. However, a foam is still produced wherein the number and size of the cavities and the thickness of the partition walls vary over large ranges and a foam having an optimum relation between the strength and the weight by volume, cannot be uniformly produced.

It is a primary object of the present invention to provide a process for foaming polyamide plastics wherein the structure of the foam, i.e., the size and number of pores and the thickness of the partition walls can be controlled and a uniform foamed material produced. According to the process of the present invention the above-mentioned object is achieved by the combined effect of foam stabilizers and finely divided, porous substances which are added to the reaction mixture prior to polymerization and which cooperate to produce a synergistic effect during the polymerization. It has been found that according to the present invention, each particle of the porous substance when used in combination with the stabilizer material acts as an expansion nucleus. The exceptional activity of each particle of the porous substance is not achieved when the porous substance is added to the reaction mixture alone and in the absence of the foam stabilizer.

According to the present invention, each particle of the porous substance produces an expansion nucleus in the polymerizing polyamide material and thus the number of pores to be formed is not left to chance but effectively controlled.

It has also been unexpectedly found that with application of the porous particulate material, the stabilizer and a 'blowing agent,' a well-controlled structure of foamed polyamide is obtained, having a homogeneous distribution of an accurately defined number of expansion pores having a uniform, controlled size.

It is essential to the present invention that the finely divided, porous substances have an open cell structure which the blowing agent can readily penetrate and conversely, is not readily penetrated by the lactam monomers. Both inorganic and organic porous substances can be applied. Suitable inorganic substances are, for example, minerals such as expanded perlite, expanded vermiculite, ground pumice stone, lava, silicon dioxide in porous form, such as kieselguhr, gas-chromatography carriers like CHROMOSORB or DIATOPORT, and further carbon black, foam glass with an open structure and other synthetic or natural, expanded, inorganic substances. A particularly preferred inorganic substance is expanded perlite. Suitable porous, organic substances include foam plastics having a melting or softening temperature which is in excess of the polymerization temperature of the present process, i.e., urea formaldehyde foam or phenol formaldehyde foam.

For optimum results, the porous material should not be excessively coarse or excessively fine. Particle dimensions ranging between the screen sizes of 60 and 110 mesh are preferred. The quantity of porous material to be added can vary over very wide limits and depends on the number of cells per unit of foam which is desired. As a rule, quantities of 0.1 to 20% by weight, referred to the amount of lactam monomer to be polymerized, can be effectively used. Preferably quantities of 0.5 to 2% by weight are used.

Suitable foam stabilizers which can be utilized in practising the present invention are, for example, organosiloxanes, organopolysiloxanes and organosiloxane oxyalkylene block copolymers (sold under the description of oils DC 190 and DC 202 of Dow Corning, oils L-520, L-530, L-540, L-542, L-544, L-5202, Y-4499 and Y-4958 of Union Carbide and SF 1066 of General Electric). The stabilizers can be added to the reaction mixture in a quantity of 0.1 to 6% by weight. A quantity of 0.5 to 1.5% by weight, referred to the total amount of monomer, is particularly preferred.

The blowing agent can be introduced as an inert gas during the polymerization or formed in situ in the reaction mixture from a substance which gnerates gas or evaporates at the reaction temperature. The blowing agents of the prior art can all be used, particularly preferred blowing agents are low-boiling aliphatic, aromatic or cyclic hydrocarbons, such as methane, butane, pentane, hexane, petroleum ether, turpentine, benzene, toluene or cyclohexane or mixture thereof, and wholly or partially halogenated hydrocarbons. Further, substances which are gaseous at room temperature may be introduced, such as nitrogen, carbon dioxide, methyl chloride or 1.2-dichlorotetrafluorethane. Solids which decompose and discharge gas upon being heated, such as dinitrosopentamethylene tetramine, ammonium carbonate, oxalates, azides, hydrazides or azodicarbonamide, can be used as the blowing agents. The type and the quantity of the blowing agent to be added are determined, as in the prior art, by the desired foam density. Quantities of from 1.5 to 10% by volume, referred to the monomer quantity, can be used. The blowing agent may be separately added to the monomer, or added to the porous substance and then the porous substance containing the blowing agent is added to the reaction mixture.

The polyamide is produced by the anionic polymerization of an omega-lactam of 4–16 carbon atoms, such as, butyrolactam, caprolactam, oenantholactam, caprylolactam, decyl lactam, undecyl lactam, laurolactam, and mixtures of two, three or more of the above lactams. The properties of foamed polyamides to be produced can be varied by varying the composition of the mixture of monomers used as starting materials. The polymerization is usually accomplished in the presence of a catalyst. Suitable catalysts are well known in the polyamide art, i.e., lactam-N-anions, which are obtained from lactam-metal compounds such as sodium caprolactam. The lactam metal compounds can be obtained by reacting a lactam with, for instance, alkali metals, earth alkali metals and alkaline-reacting compounds of these metals, such as hydrides, boron hydride, oxides, hydroxides, alkanolates and carbonates, Grignard-compounds such as alkyl magnesium bromide and aryl magnesium bromide, and metal alkyl compounds such as diisobutyl aluminum hydride, triethyl aluminum, diethyl aluminum chloride, triisopropyl aluminum, diethyl zinc and alkali metal alkyls. The quantity of the catalyst used can be varied within wide limits. As a rule, 0.1 to 5 mol.%, referred to the quantity of lactam to be polymerized, is applied, but larger amounts if, for instance, 5 to 10 mol. % may also be used.

A promoter can also be used in the anionic polymerization of the polyamide. The promotors can be any one or more of the promotors well known in the anionic polymerization art. The quantity of promotor used can vary from about 0.1 to about 2 mol.% referred to the amount of lactam to be polymerized. Examples of promoters which are particularly preferred in the preparation of the polyamides of the present invention are isocyanates, such as phenyl isocyanate, hexamethylene diisocyanate, tetramethylene diisocyanate, toluene diisocyanate, 1.2-diisocyanatomethylcyclobutane, triisocyanatophenylmethane or a combination of several of these isocyanates.

The temperature at which the anionic polymerization is carried out should be within the temperature range of from about 90° to about 250°C., this being the normal temperature range fro the polymerization of lactams. The temperature should be below the melting point of the polyamide to be prepared. For instance, for caprolactam an initial temperature of from 125° to 175°C. is preferred.

The polymerization is completed in a relatively short time, often is less than 10 minutes, and foamy, macromolecular products are obtained having the dimensions of the reaction zone or mold in which the polymerization was accomplished. As a rule, this zone already possesses the shape of the object to be prepared, however, the object produced may be subjected to further shaping treatments. The objects produced usually have a dense skin. The thickness of this skin can be influenced by varying the wall temperature of the mold. A strong skin surrounding the mass of foam can be achieved, and thus impart a great flexural strength to the foamed objects.

The process according to the invention is not restricted to the use of stationary molds. Rotating and/or oscillating molds can be used and are particularly useful in the manufacture of hollow objects, such as tubes with a thermal insulating wall.

The invention will be further described with the aid of the drawings and the following examples.

IN THE DRAWINGS

FIG. 1 is a picture of a cross-section of foamed polyamide produced as described in Example 9.

FIG. 2 is a picture of a cross-section of a foamed polyamide produced as described in Example 10.

FIG. 3 is a picture of a cross-section of a foamed polyamide produced as described in Example 11.

FIG. 4 is a picture of a cross-section of a foamed polyamide produced as described in Example 12.

FIG. 5 is a full sized picture of the cross-section shown in FIG. 3.

FIG. 6 is a full sized picture of the cross-section shown in FIG. 4.

EXAMPLE 1

Thoroughly dried caprolactam was mixed in a storage tank with 2 mol.% of sodium hydride at a temperature of about 90°C. In a second storage tank, caprolactam, also in dried condition, was mixed with 0.8 mol. % of tribenzamide at a temperature of some 90°C.

Equal parts by volume of the two components were subsequently transferred to separate test tubes and 6% by volume of dried petroleum ether (a fraction with a boiling range of 60° to 80°C.) were added to the test tube containing the caprolactam and tribenzamide. The temperature of the petroleum ether which was added was not more than 80°C.

The components of each test tube were heated to a temperature of 130°C. whereupon the components of each test tube were combined and thoroughly mxied in a polymerization tube. This tube was placed in an oil heating bath, having a temperature of about 160°C., until the polymerization was completed.

The polymerization product formed had a few large blisters. A foam structure was not present.

EXAMPLE 2

The procedure of Example 1 was repeated with the exception that 1% by weight of silicone oil 'DC 190' (referred to the total quantity of end-product) was transferred to the test tube containing caprolactam prior to heating the caprolactam to 130°C.

EXAMPLE 3

The test procedure of Example 1 was again repeated with the exception that 1% by weight (based on the total weight of foamed polyamide to be produced) of expanded perlite, of a screen fraction of between 72 and 110 mesh, was transferred to the test tube containing caprolactam prior to heating the caprolactam to 130°C.

During the polymerization, the reactants foamed to about four times their original volume; the density of the foam obtained was approximately 240 kg per m³. The structure of the cell showed regularly divided coarse and fine cells; the size of the cells ranged from 0.2 to 3.5 mm.

EXAMPLE 4

The test procedure of Example 1 was repeated with the exception that 1% by weight of silicone oil 'DC 190' and 1% by weight of expanded perlite (the fraction of 110 to 72 mesh) were transferred to the test tube containing the caprolactam prior to heating the caprolactam of 130°C (the two quantities by weight being referred to the total amount of polyamide foam produced).

During the polymerization the reactants foamed to about five times its volume; the density of the foam obtained was approximately 190 kg per m³. The structure of the cell was fine and very uniform with the size of the cells ranging from 0.2 to 0.4 mm.

EXAMPLE 5

The same series of tests as described in Examples 1 through 4 was conducted with the exception that hexamethylene diisocyanate was used as a promoter instead of the tribenzamide. Each time 0.25 mol. % was added, referred to the total quantity of monomer. The results were identical of those of the series of tests of the Examples 1 to 4 inclusive.

EXAMPLE 6

A number of substances in finely divided condition were tested as substitutes for the perlite of Example 4, using the test procedures of Example 4. The products obtained were judged for foam structure and the results listed in the following table. In the table "moderate" is considered to be equivalent to the foam shown in FIG. 3, "very good" is considered to be equivalent to the foam shown in FIG. 4, "bad" or "insufficient" means that the structure was very irregular and contained large blisters.

| Additive | Result | Density kg per m³ |
|---|---|---|
| zinc oxide | none | |
| copper powder | none | |
| barium carbonate | none | |
| glass powder | none | |
| quartz powder | none | |
| glass fiber | none | |
| kaolinite | none | |
| bentonite | none | |
| barden clay | none | |
| calcium chloride | none | |
| carborundum | none | |
| titanium dioxide | none | |
| akulon | none | |
| akulon | none | |
| asbestine | none | |
| santowax P | none | |
| microasbestor | none | |
| abrilwax PDS | none | |
| potassium stearate | none | |
| lithium stearate | none | |
| magnesium oxide | bad | 205 |
| slate dust | bad | 175 |
| barium sulphate | bad | 235 |
| griesamid | bad | 190 |
| rilsan | bad | 165 |
| potassium bichromate | bad | 165 |
| marl | bad | 220 |
| gypsum | bad | 165 |
| norit | insufficient | 235 |
| sodium acetate | insufficient | 180 |
| sodium oxalate | insufficient | 195 |
| hydrostone | insufficient | 145 |
| barium chloride | insufficient | 180 |
| mica | insufficient | 165 |
| potassium chloride | moderate | 165 |
| talcum powder | moderate | 205 |
| ground chalk (porous) | moderate | 250 |
| vermiculite, coarse | moderate | 165 |
| CHROMOSORB P 45 to 60 mesh* | moderate | 165 |
| CHROMOSORB P 60 to 80 mesh* | moderate | 165 |
| expanded perlite 32 to 17 mesh | good | 165 |
| expanded perlite 17 mesh | good | 180 |
| expanded vermiculite, fine | good | 165 |
| kieselgurh | good | 165 |
| ground pumice stone | good | 200 |
| CHROMOSORB W 80 to 100 mesh* | good | 160 |
| CHROMOSORB G 60 to 80 mesh* | good | 160 |
| DIATOPORT S 80 to 100 mesh* | good | 160 |
| expanded perlite 32 mesh | very good | 120 |
| carbon black | very good | 175 |
| CHROMOSORB AW-DMCS 60 to 80 mesh* | very good | 120 |

*CHROMOSORB and DIATOPORT (Trade Names) are very porous silica products

EXAMPLE 7

In accordance with the procedure of Example 1, 60 g. of caprolactam, 1 mol.% of sodium hydride, 0.6 g. of silicone oil 'DC 190', 0.4 mol.% of tribenzamide, 6.6% by volume of a mixture of hexane and cyclohexane in a ratio of 1:1, and 1.0 weight % of ground urea-formaldehyde foam were used to produce a foamed material.

The polymerization product expanded into a foam of very fine cells, comparable to the product obtained in Example 4, having a density of approximately 160 kg per m³.

The ureum-formaldehyde foam added has been obtained from a commercial glue powder called 'Melocol 306' (CIBA). The density of the foam amounted to 170 kg per m³ and the foam had been ground into grains of 0.1 to 0.2 mm.

EXAMPLE 8

The procedure of Example 7 was repeated with the exception that phenol-formaldehyde foam particles were used in place of the ureum-formaldehyde foam. However, now previous extraction of the foam was necessary to remove substances therefrom which would be damaging to the polymerization of caprolactam. A foam product was obtained which was comparable to the product of Example 7. When phenol-formaldehyde foam with a closed structure (the so-called 'microballoons') was added, an unsatisfactory result was obtained.

EXAMPLE 9

Thoroughly dried caprolactam was mixed in a storage tank with 2 mol.-% of sodium hydride at a temperature of about 90°C. In a second storage tank, caprolactam, also in dried condition, was mixed with 0.6 mol.-% of hydrochloric acid salt of dicaprolactimether at a temperature of some 90°C.

Equal parts by volume of the two components were subsequently transferred to separate test tubes and 6% by volume of dried petroleum ether (a fraction with a boiling range of 60° to 80°C.) was added to the test tube containing the caprolactam and acid salt of decaprolactimether.

The components of both test tubes were then heated separately to a temperature of 130°C and then combined and thoroughly mixed in a polymerization tube. This tube was then placed in an oil heating bath, having a temperature of about 160°C. until the polymerization was completed.

The polymerization product formed had large blisters. A foam structure was not present. The product resembled that shown in FIG. 1.

EXAMPLE 10

The test procedure of Example 9 was repeated with the exception that 1% by weight of silicone oil 'DC 190' (referred to the total quantity of end-product) was transferred to the test tube containing the caprolactam and acid salt of dicaprolactimether prior to heating of the material to 130°C.

The polymerization product formed was very similar to the product of Example 9 (resembling the product shown in FIG. 2).

EXAMPLE 11

The test procedure of Example 9 was again repeated with the exception that 1% by weight of expanded perlite, of a screen fraction of between 72 and 110 mesh, was transferred to the test tube containing the caprolactam and acid salt of dicacaprolactim-ether prior to heating of the material to 130°C. (the percentage by weight being referred to the total quantity of end-product).

During the polymerization, the product foamed to about four times the volume of the original reactants; the density of the foam obtained was approximately 250 kg per m$^3$. The product contained regularly divided coarse and fine pores; the size of the pores ranged from 0.2 to 2.0 mm. The product resembled that shown in FIGS. 3 and 5.

EXAMPLE 12

The test procedure of Example 9 was again repeated, the only difference being that the 1% by weight of silicone oil 'DC 190' and 1% by weight of expanded perlite (the fraction of 110 to 72 mesh) were transferred to the test tube containing the caprolactam and acid salt of dicaprolactimether prior to the material being heated to 130°C. (the two quantities by weight being referred to the total amount of end-product).

During the polymerization, the product foamed to about five times the volume of the original reactants; the density of the foam obtained was approximately 200 kg per m$^3$. The foam contained pores which were fine and very uniform; the size of the pores ranged from 0.2 to 0.6 mm. The foam resembled that shown in FIGS. 4 and 6.

EXAMPLE 13

In accordance with the procedure of Example 1, 60 g of caprolactam, 1 ml.% of sodium hydride, 0.6 g of silicone oil 'DC 190', 0.3 mol.% of hydrochloric acid salt of dicaprolactimether, 6.0% by volume of dried petroleum ether as well as 1.0 weight % of ground urea-formaldehyde foam were used to produce a foamed material.

The polymerization product expanded into a foam of very fine cells being comparable to the product obtained in Example 4 and shown in FIGS. 4 and 6. The product had a density of approximately 210 kg per m$^3$.

The urea-formaldehyde foam which is used in the example was obtained from a commercial glue powder called 'Molccol 306' (CIBA). The density of the foam ranged from about 120 to about 250 kg per m$^3$ and the foam had been ground into grains of about 0.1 to about 0.2 mm.

EXAMPLE 14

In order to determine mechanical properties of the polyamide foam a number of test foam-plates have been made in a well-lockable, not completely gas-tight, aluminum matrix.

The dimensions of this matrix are (internally) 255 × 272 × 35 mm, whilst its wall thickness amounts to 8 mm.

By applying 'overpack' the test foam-plates are as equal as possible in density. In this connection 'overpack' is understood to mean the introduction into the lockable foam-matrix of such a quantity of components that the test foam, in the case of 'free' foaming, would occupy a larger volume than do the contents of the closed matrix.

Experiment 1

In a storage vessel, stringently dried caprolactam was mixed with 2 mole % of sodium hydride at a temperature of about 90°C.

In a second storage vessel, again at a temperature of approximately 90°C, dried caprolactam was mixed with 0.6 mole % of the hydrochloric acid salt of dicaprolactimether.

Equal quantities of the two components were than drained and introduced into separate test tubes.

Next, 8% by volume of dried petroleum ether (a fraction with a boiling range of from 80° to 100°C) were added to the latter component, whose temperature did not exceed 80°C at that moment.

Into the former component 1 weight % of silicone oil 'DC 190' (referred to the total quantity of end-product) was inserted.

The matrix was supplied with 0.4 weight % of expanded perlite of a sieve fraction lying between 72 and 110 mesh.

This quantity has also been determined starting from the total quantity of end-product.

The two components were then heated separately, under conditioned circumstances, until they had reached a temperature of 130°C, finally, they were combined and intensively mixed in the matrix, which had a temperature of 160°C and which has been provided carefully with a nitrogen atmosphere.

The foam plate formed released well from the matrix and is attractive and smooth in appearance, whilst there is a good bond between the skin and the foam layer. The thickness of the skin averages 0.10 – 0.20 mm. The foam formed has a reasonably fine cell structure.

Experiment 2 (not according to the invention)

The matrix used in experiment 1 was provided on the inside with a PTFE layer prior to the experiment being conducted, which layer was applied by spraying. After five layers has been applied, the matrix was ready for use. Caprolactam, to which 2 weight % of silicone oil 'DC 193', 12 weight % of sodium formate and 6 weight % of hexamethylenediisocyanate had been added, was weighed out and inserted into the cold matrix.

Under carefully conditioned circumstances, the matrix was placed in a circulation-furnace which had a temperature of 180°C.

The foam plate formed was hardly removable from the matrix without damaging the casting.

The skin had a moderate bond with the foam layer.

The thickness of the skin averaged 0.05 – 0.10 mm.

The foam formed had a fine cell structure.

The two test plate series, prepared according to the examples I and II, were equal in 'overpack' and overall density.

By means of a comperative, three-point bending test, at differing lengths between the points of support, the stiffness was determined both of specimens from the foam plate according to experiment I and of specimens from the foam plate according to experiment II.

When calculating the stiffness in the bending test, a correction was made for the local indentation of the material caused by the supports.

In all cases such a bending rate was chosen that the rate of deformation occurring in the skin of the specimen amounted to 0.25% per minute, in spite of the varying distances between the points of support.

By means of the product E.I. the stiffness is rendered as the stiffness in bend.

|  | Experiment I | Experiment II |
|---|---|---|
| total thickness of foam plate (cm) | 3.5 | 3.5 |
| density (overall density) (kg/cubic meter) | 210 | 210 |
| stiffness $\frac{P}{y.b}$ (kg/cm.cm) at a length of |  |  |
| $\iota = 20$ cm | 47 | 20 |
| $\iota = 10$ cm | 210 | 90 |
| $\iota = 5$ cm | 500 | 180 |
| stiffness $\frac{E.I}{b}$, calculated from $\frac{P}{y.b}$, neglecting any shearing deformations resulting from transverse forces as $\iota > 20$ cm |  |  |
| $\frac{E.I}{b}$ (kg.cm²/cm) | 7700 | 3300 |

Table I - Comparison of the stiffness in bend of two types of polyamide-foam castings.

Explanation of the characters used:
$b$ = width of specimens (cm)
$y$ = deflection of specimen (cm)
$E.I.$ = product modulus and moment of inertia, rendering the stiffness in bend $\left(\frac{kg}{cm^2} \cdot cm^4\right)$ $\iota$ = chosen length between points of support
$P$ = force measured, in kg32

The measuring results show that the stiffness in bend measured for the test foams made according to experiment I was approximately twice as large as that of the specimens according to experiment II.

What is claimed is:

1. In a process for preparing foamed polyamide materials by anionically polymerizing lactam monomers in the presence of blowing agents and pore-controlling agents, the improvement for controlling the size and number of pores and the thickness of the partition walls to produce a substantially uniformed foamed material consisting essentially in adding before polymerizing the combination of (1) at least one substance having an open cell structure, and being a member of the group of
   a. porous inorganic substances selected from the group consisting of expanded perlite, expanded vermiculite, pumice, lava and silicon dioxide in porous form, and
   b. synthetic expanded porous resin having a melting or softening temperature which is higher than the polymerization temperature of the said lactam monomers to be polymerized, and selected from the class consisting of foamed urea formaldehyde resin and foamed phenol formaldehyde resin,
   said porous substances having a particles size ranging between about 60 and 110 mesh and present in said lactams monomers to be polymerized in a quantity of about 0.1 to 2 weight %; and
(2) at least one organosiloxane present in said lactams monomers to be polymerized in a quantity of about 0.1 to 1.5 weight %.

2. The process of claim 1, wherein said organosiloxane is selected from the group consisting of organopolysiloxanes and organosiloxane oxyalkylene block copolymers.

3. A process according to claim 1, wherein the blowing agents are added to the porous substance prior to the latter being added to the reaction mixture.

4. A foamed polyamide product prepared according to the process of claim 1.

5. The process of claim 1 wherein said porous substance is expanded perlite.

6. The process of claim 1 wherein said porous substance is silicone dioxide.

7. The process of claim 1 wherein said porous substance is expanded vermiculite.

8. The process of claim 1 wherein said porous substance is pumice.

9. The process of claim 1 wherein said porous substance is lava.

10. The process of claim 1 wherein said resin is a foamed urea formaldehyde resin.

11. The process of claim 1 wherein said resin is a foamed phenol formaldehyde resin.

* * * * *